W. F. BEARNS.
Ageing Liquors.
No. 69,390. Patented Oct, 1, 1867.
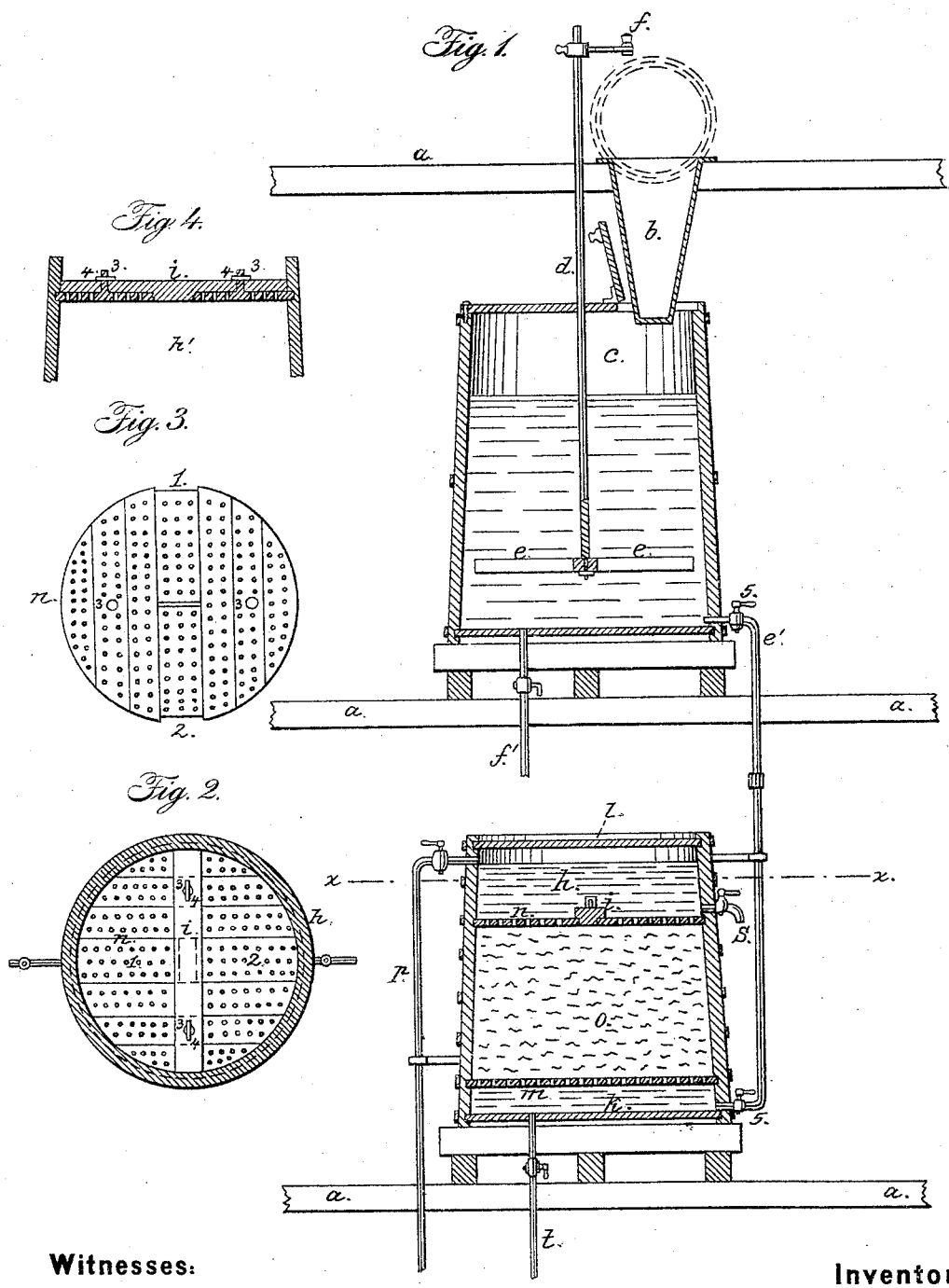

United States Patent Office.

WILLIAM F. BEARNS, OF MOUNT PLEASANT, NEW YORK.

Letters Patent No. 69,390, dated October 1, 1867; antedated September 19, 1867.

IMPROVED APPARATUS FOR FILTERING AND PURIFYING SPIRITS.

The Schedule referred to in these Letters Patent and making part of the same.

TO ALL WHOM IT MAY CONCERN:

Be it known that I, WILLIAM F. BEARNS, of Mount Pleasant, in the county of Westchester, and State of New York, have invented, made, and applied to use, a certain new and useful Improvement in Rectifying Spirits; and I do hereby declare the following to be a full, clear, and exact description of the said invention, reference being had to the annexed drawing making part of this specification, wherein—

Figure 1 is a vertical section of my rectifying apparatus as in place for use.

Figure 2 is a sectional plan of the rectifier at the line $x\ x$.

Figure 3 is a plan showing the manner in which the perforated diaphragm over the filtering medium is to be removed; and Figure 4 is a section of the same, at right angles to fig. 1.

Similar marks of reference denote the same parts.

The object of my invention is to exclude the atmosphere from the spirit while being rectified by filtration, and at the same time cause the filtration to be upwards instead of downwards, as heretofore usual. By this means I prevent evaporation, and the galvanic action between the charcoal and metal in the presence of atmospheric air, consequent upon the usual mode of filtration, and avoid the disagreeable odors and flavors imparted to most all charcoal-rectified spirits.

The nature of my said invention consists in a vessel for receiving charcoal or similar filtering medium, formed with a space below such medium, into which the spirit is supplied from a hydrostatic column, so as to rise through such filtering medium and pass off by an overflow pipe, the said rectifying-vessel being tightly closed to exclude atmospheric air, and provided with means for removing the charcoal and repacking the same, without material loss of the spirit.

In the drawing, $a\ a$ represent the floors of a building containing my apparatus. $b$ is a hopper, with a wire strainer, through which the unrectified spirit is emptied from barrels into the reservoir $c$. $d$ is a vertical shaft, with arms $e\ e$ at the lower end, and a crank, $f$, at the upper end, to agitate the spirit and make the mass of one uniform proof. $e'$ is a pipe and cock, through which the spirit is allowed to flow in a regulated quantity to the rectifier, and $f'$ is a pipe and cock that may be employed for drawing off any sediment or liquid employed in washing out the reservoir $c$. $h$ is the rectifying-vessel, formed as a wooden vat, having a bottom, $k$, and head $l$. This head $l$ is set tightly within grooves in the staves of the vessel $h$, and may be removed by loosening the upper hoops. $m$ is a perforated false bottom, set permanently into grooves formed around the inside of the vessel $h$. Upon this the charcoal, or similar filtering material, is packed and retained by a movable perforated head, $n$, formed of sections, so that it can be taken out for removing the filtering medium when exhausted, and packing in fresh charcoal. This movable perforated head sets in grooves around the inside of the vessel $h$. $i$ is a movable cross-bar, having a block on its under side, entering between the two sections 1 and 2. This cross-bar is to be held down by the pins 3 3 and keys 4, and when removed the sections 1 and 2 can be drawn inwards, so that their ends come out of the grooves in the inside of the vessel $h$, and after they are taken out, the other sections of the perforated head $n$ can be slidden towards the centre of the vessel $h$ and removed, giving free access to the filtering medium. The spirit is supplied by the pipe $e'$ and its cock 5, into the space below the charcoal $o$, and, rising through the same, is rectified, and flows away by the pipe $p$ to a suitable receiver, which should be on the floor below, and made with a head to exclude the atmosphere.

It will be seen that the filtering medium is always immersed in the spirit, and that the sediment will remain below the charcoal, while the essential oils and foreign matters remain in the charcoal, and there being little or no metal in the filter, and the atmosphere being excluded, there is no galvanic action, and the disagreeable taste often found in spirits is avoided.

A cock is provided at $s$, by which the rectified spirit above the filtering medium can be withdrawn previous to cleansing the rectifier, and sediment and the liquid in the vessel $h$ may be withdrawn by the pipe and cock $t$, previous to removing the charcoal.

What I claim, and desire to secure by Letters Patent, is—

1. The rectifying vessel $h$, provided with the overflow pipe $p$, supply pipe $e'$, perforated false bottom $m$, and perforated head $n$, between which the filtering material is retained, as and for the purposes set forth.

2. I claim the perforated head $n$, formed with the movable sections 1 and 2, held in place by the cross-bar $i$, fitted in the manner and for the purposes set forth.

Dated this fourth day of March, A. D. 1867.

WM. F. BEARNS.

Witnesses:
CHAS. H. SMITH,
GEO. D. WALKER.